Jan. 4, 1927.

C. F. GOUDY 1,613,032

VARIABLE CONDENSER

Filed Oct. 30, 1924

INVENTOR

Carl F. Goudy

BY

Pennie, Davis, Marvin & Edmonds

ATTORNEYS

Patented Jan. 4, 1927.

1,613,032

UNITED STATES PATENT OFFICE.

CARL F. GOUDY, OF FLUSHING, NEW YORK, ASSIGNOR TO PACENT ELECTRIC COMPANY, INCORPORATED, OF NEW YORK, N. Y., A CORPORATION OF NEW YORK.

VARIABLE CONDENSER.

Application filed October 30, 1924. Serial No. 746,728.

This invention relates to electrostatic condensers and has to do with improvements in the insulation qualities of variable electrostatic condenser structures.

The object of this invention is to improve the insulation resistance between the movable and stationary elements of variable condensers, and to this end the invention consists, first, in the provision of a shaft of insulating material, specifically pyrex glass, upon which the movable plates of the condenser are mounted, and, second, the details of construction whereby the use of a glass shaft is rendered practicable.

It has been found that with the single exception of natural quartz, pyrex glass is the best insulating material possessing any substantial mechanical strength. For this reason it has heretofore been proposed to utilize pyrex glass rods for supporting the fixed plates of variable condensers. By such construction it has been found possible to produce a variable condenser having minimum losses. However, condensers of the type just referred to involve the use of at least two and generally three glass rods for supporting the fixed plates.

According to this invention, instead of mounting the fixed plates on glass rods it is proposed to mount the movable plates on a glass shaft, thereby reducing the number of glass elements required to one, and further improving the insulation resistance by cutting down the possibility of surface conduction. A further advantage accruing to the present invention is that the cost of construction is somewhat reduced without in any wise impairing the quality of the product.

Figure 1:
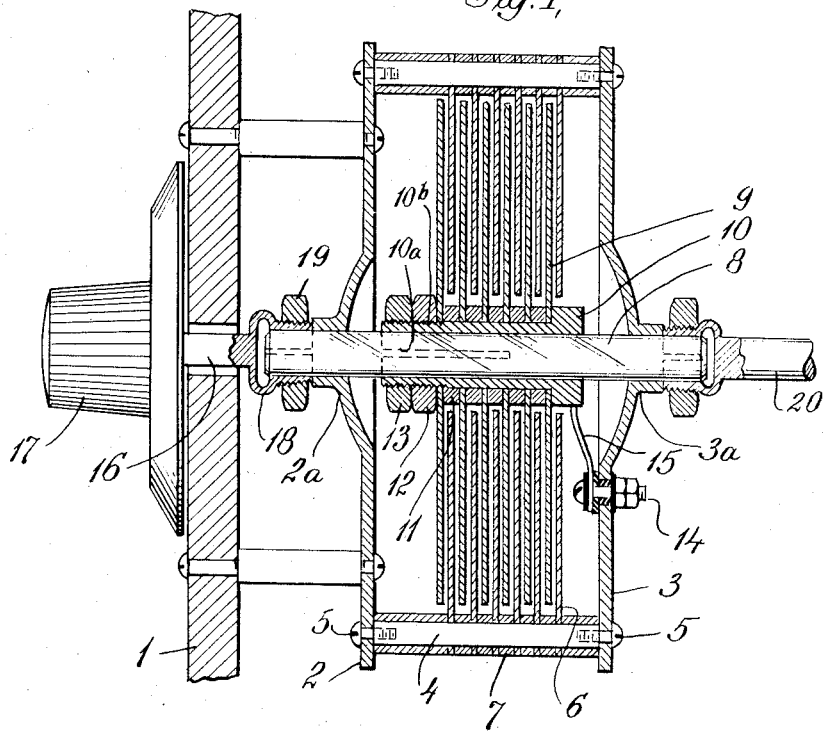
Figure 2:
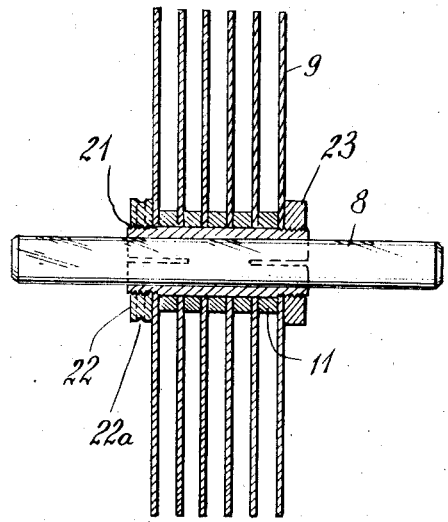
Figure 3:
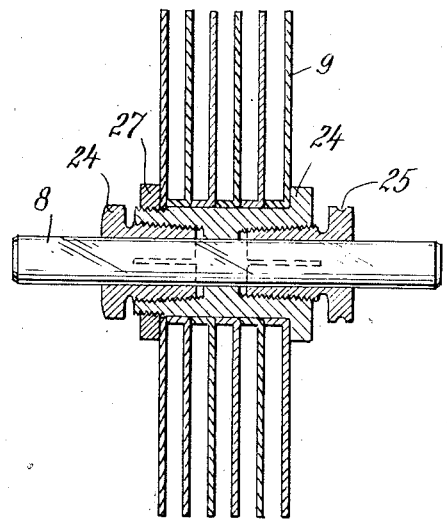

Three embodiments of the invention are illustrated in the accompanying drawing in which Fig. 1 is a cross-sectional view of a variable condenser mounted on a panel and provided with a control dial and Figs. 2 and 3 are each cross-sectional views of modified forms of movable elements which may be substituted for the movable elements shown in Fig. 1.

Referring first to Fig. 1—1 is a panel upon which the condenser is mounted. The condenser structure comprises a pair of metal end plates 2 and 3 spaced apart and held together by means of rods 4 and screws 5. The fixed plates 6 are mounted on the rods 4 and spaced apart in the usual manner by means of separators 7. End plates 2 and 3 are formed with bearing portions $2^a$ and $3^a$ in which is journaled a pyrex glass shaft 8. With a view to securing the movable plates 9 upon the shaft 8 there is provided a metal bushing 10 which is split in two or three places about its circumference as indicated at $10^a$ and is provided with a tapered thread $10^b$. The movable plates 9 are mounted on the bushing 10 and properly spaced apart by separators 11 and are held in place by means of nuts 12 and 13 which like the bushing 10 are provided with tapered threads and which upon being drawn up function both to clamp the movable plates together and to contract the bushing 10 into clamping engagement with the glass shaft.

An electrical connection to the movable element may be provided for by means of a binding post 14 which is mounted on and insulated from the end plate 3 and a flexible pigtail connection 15 between the binding post and the bushing 10. The connections to the fixed plate can, of course, be made at any part of the stationary portion of the structure.

Inasmuch as it is not desirable from a practical standpoint to perform any machining operations on the glass shaft the metal shaft 16 interconnecting the dial 17 with the movable element of the condenser is provided with an integral split sleeve 18 having an external tapered thread engaged by a nut 19. Upon nut 19 being drawn up the split sleeve 18 is contracted into clamping engagement with the end of the glass shaft.

An extension shaft 20, likewise provided with a split sleeve may be applied to the other end of the shaft 8 and utilized for operating another condenser.

The movable element shown in Fig. 2 differs from that of Fig. 1 in that the bushing 21 is made of metal tubing which requires no turning down operation and is threaded and split at both ends. Nuts 22 and 23 are provided at the respective ends of bushing 21. Nut 22 is shown provided with a circumferential groove $22^a$ which may be conveniently utilized for guiding the pigtail connection.

The movable element illustrated in Fig. 3 comprises two split and threaded bushings 24 and 25 and another bushing 26 provided with internal tapered threads engaging the external tapered thread of the bushings 24 and 25. It will be seen that when the bushings 24 and 25 are screwed into the bushing 26 the former are contracted into clamping engagement with the glass shaft. The condenser plates are mounted on the exterior of bushing 26 and properly spaced apart and are held in place by means of a nut 25 which engages an external thread provided at one end of the bushing 26.

It is evident that the present invention may be readily embodied in a number of additional forms and it should therefore not be construed as limited except by the scope of the appended claims.

I claim:

1. In a variable electrostatic condenser, fixed plates and rotatable plates, a rotatable glass shaft, and means for securing said rotatable plates to said shaft, said means comprising a contractible bushing adapted to clampingly engage said shaft, and means for contracting said bushing into clamping engagement with said shaft.

2. In a variable electrostatic condenser, fixed plates and rotatable plates, a rotatable glass shaft, and means for securing said rotatable plates to said shaft, said means comprising a bushing, said bushing being split a portion of its length and having an external taper thread, a nut engaging the thread in said bushing and operable to contract said bushing into clamping engagement with said shaft, said rotatable plates being mounted on said bushing.

In testimony whereof I affix my signature.

CARL F. GOUDY.